United States Patent Office 2,884,466
Patented Apr. 28, 1959

2,884,466

MANUFACTURE OF FLUORINATED ORGANIC COMPOUNDS

Murray Hauptschein, Montgomery County, Milton Braid, Philadelphia, and Francis E. Lawlor, Montgomery County, Pa., assignors to Pennsalt Chemicals Corporation, a corporation of Pennsylvania No Drawing. Application January 22, 1957
Serial No. 635,128

12 Claims. (Cl. 260—653)

This invention relates to a method for making fluorinated organic compounds and in particular to a process for coupling certain perfluoro- and perfluorochloroalkyl iodides.

Highly fluorinated organic compounds have come into increasing use in recent years as lubricants, dielectrics, fire extinguishers, heat transfer media, solvents, plasticizers, gasket and valve packings and protective coatings. They are especially desirable because of their great stability at high temperatures and chemical inertness.

One method of making relatively long chain fluorinated compounds is by the so-called telomerization technique in which a fluorinated iodide, AI, is reacted with an unsaturated fluorinated compound, B, to give compounds having the general formula $A(B)_nI$ where $n$ is from 1 to say 20. The presence of the iodine atom at the end of the chain in such compounds decreases their stability and before they can be put to practical use it is usually necessary to stabilize them. One way in which such compounds may be stabilized is to couple two molecules together, eliminating iodine and forming a chain having twice the length of the original. Previous techniques for carrying out such coupling reactions have in many cases involved the use of metallic mercury and ultraviolet radiation which is expensive and not well suited to industrial techniques.

It is an object of the present invention to provide a method for coupling certain highly fluorinated iodides which is simple and economical to carry out.

It is another object of the invention to provide a method for coupling fluorinated iodides in which the use of metallic mercury is eliminated.

It is another object of the invention to provide a method for the coupling of certain fluorinated iodides in which heat is used to supply energy for the reaction.

In accordance with the invention these objectives are attained by means of a process which comprises heating perfluoro- or perfluorochloroalkyl iodides having the structure $$R[CF_2\text{---}CFX]_nI$$

in the presence of mercuric oxide. In the above formula R is selected from the group consisting of chlorine, fluorine, and alkyl, fluoroalkyl, chloroalkyl and fluorochloroalkyl radicals having not more than about 6 carbon atoms. Preferably R is a perfluoro alkyl radical, e. g. —$C_mF_{2m+1}$ where $m$ is not greater than 6 or a perfluorochloroalkyl radical having not more than about 6 carbon atoms. As used herein the term perfluorochloro means a radical consisting of carbon, fluorine and chlorine having more fluorine than chlorine. In the formula X is selected from the group consisting of chlorine and —$CF_3$ radicals, and $n$ is an integer from 1 to about 20, preferably from 1 to say 10. The invention is particularly applicable to perfluoroalkyl and perfluorochloroalkyl iodides such, for example, as compounds of the type $C_3F_7[CF_2CF(CF_3)]_nI$ and $$CF_2ClCF(CF_3)[CF_2CF(CF_3)]_nI$$

whose preparation is described in our copending application Serial No. 614,821, filed October 9, 1956; and to perfluorochloroalkyl iodides of the type $Cl[CF_2CFCl]_nI$, whose preparation is described in R. N. Haszeldine, Journal of the Chemical Society (London), December 1955, pages 4291 to 4302 inclusive.

The compounds obtained by the coupling reaction will in general have the formula $$R[CF_2\text{---}CFX]_n[CFX\text{---}CF_2]_nR$$

where R and X are as indicated above.

It will be understood that a mixture of two or more different iodides conforming to the general formulas given above may be mixed and reacted simultaneously to give mixed products.

The conditions of reaction are subject to considerable variation. The temperature at which the reaction is conducted may range from about 150 to about 350° C., preferably from about 170° C. to about 250° C.

Pressure is not a critical factor. The reaction is generally carried out between about 1 mm. Hg and about 1000 atm. usually between about 1 atm. and about 100 atm.

The proportion of mercuric oxide which is used may range from about 0.1 to about 10 mols per mol of iodide, preferably between about 1 and about 5 mols. The mercuric oxide is usually introduced as a powder; however it may be used in other physical forms, for example as pellets or granules.

The reaction time is not critical and will be whatever is required to obtain a satisfactory yield. It may range from about 1 minute to about 100 hours, and is normally between about ½ hour and about 20 hours.

The technique used in effecting the reaction is also not critical. The reaction may be carried out by introducing the iodide, or iodides, and mercuric oxide into a sealed vessel made of some inert material such as Pyrex or Monel and heating for whatever time is required to complete the reaction. Alternatively the reaction mixture may be circulated through a heated tube. Other conventional techniques may also be employed.

The invention will be further described in the following examples. It is understood that the examples are given for purposes of illustration only and are not to be taken as in any way restricting the invention beyond the scope of the appended claims.

*Example 1.*—A mixture of 2-iodoperfluorohexane (5 g., 0.011 mol) and powdered yellow mercuric oxide (3 g., 0.014 mol) was sealed in a heavy-walled Pyrex tube and heated first at 148° C. for 40 hours and then at 235° C. for 15 hours. (On initial mixing the pink iodine color was bleached and on gentle heating an exothermic reaction was observed.) The tube was then cooled and opened. The 1.5 g. of product which could be transferred in vacuo (with warming of the tube) was shown to be perfluoro-5,6-dimethyldecane, boiling point 95° C. at 45 mm., $n_D^{21}=1.2945$.

*Example 2.*—The procedure of Example 1 is followed using $C_3F_7[CF_2CF(CF_3)]_3I$ as the iodide. The coupled product $C_3F_7[CF_2CF(CF_3)]_3[(CF_3)CFCF_2]_3C_3F_7$, B.P. circa 130° C., $n_D^{39}=1.3137$, is obtained.

*Example 3.*—Two reactions using $CF_2ClCFClI$ were carried out in sealed Carius tubes. The first reaction was carried out at 232° C. for two days using 5.6 g. of $CF_2ClCFClI$ and 6.51 g. of yellow mercuric oxide. The second reaction was conducted at 220° C. for 18 hours using 28 g. of $CF_2ClCFClI$ and 43.2 g. of yellow mercuric oxide. The coupling compound $$CF_2ClCFClCFClCF_2Cl$$

was clearly shown by infrared spectroscopic analysis to be among the products formed in both cases. The conversion to $CF_2ClCFClCFClCF_2Cl$ was approximately 10% in both reactions.

*Example 4.*—The procedure of Example 3 is followed using $Cl(CF_2CFCl)_3I$ as the iodide. The coupled product $Cl(CF_2CFCl)_3(CFClCF_2)_3Cl$, B.P. 195–200° C. at about 0.1 mm. Hg, is obtained.

*Example 5.*—The compound $$CF_2ClCF(CF_3)[CF_2CF(CF_3)]_2I$$

is heated at about 235° C. with a 100% molar excess of HgO. The coupled product $$CF_2ClCF(CF_3)[CF_2CF(CF_3)]_2$$
$$[(CF_3)CFCF_2]_2(CF_3)CFCF_2Cl$$

is obtained.

From a consideration of the foregoing description it will be seen that the present invention provides a simple and efficient way of coupling fluoro iodides of the type referred to. By eliminating metallic mercury and ultraviolet radiation used in prior processes, the need for special apparatus and safety provisions is lessened. The invention thus provides a technique well suited to industrial applications.

The products which may be made by means of the novel process are useful as lubricants, heat transfer media, solvents, plasticizers and in a host of other applications. For example, the compound perfluoro-5,6-dimethyldecane whose preparation is described in Example 1 is a good dielectric and is useful as a condenser fluid.

The products obtained in Examples 2 and 5 have been used as plasticizers for polytetrafluoroethylene plastic and as thermally and chemically stable lubricants. In one instance a polytetrafluoroethylene tape, 5 mils thick and 0.1 inch wide, was immersed in the product of Example 2 at 100° C. overnight. After removal of excess liquid by drainage it was found that the plasticized product was able to support a much greater load without breaking and had an elongation of approximately twice that of the unplasticized tape.

The compound $CF_2ClCFClCFClCF_2Cl$ is recognized by the art as the main precursor in the preparation of the useful monomer perfluorobutadiene. The higher homologue coupling products have been used as lubricants.

What is claimed is:

1. A method for coupling fluoroalkyl iodides having the formula:

$$R[CF_2-CFX]_nI$$

where R is selected from the group consisting of chlorine, fluorine and alkyl, fluoroalkyl, chloroalkyl and fluorochloroalkyl radicals having not more than about 6 carbon atoms, where X is selected from the group consisting of chlorine and the —$CF_3$ radical, and where $n$ is an integer from 1 to about 20, which comprises heating said iodides in the presence of mercuric oxide.

2. The method claimed in claim 1 wherein the iodides are heated at between about 150° C. and about 350° C.

3. The method claimed in claim 2 wherein the proportion of mercuric oxide used is between about 0.1 and about 10 mols, per mol of iodide.

4. The method claimed in claim 1 wherein the iodide has the formula $$C_3F_7[CF_2CF(CF_3)]_nI$$

5. The method claimed in claim 1 wherein the iodide has the formula $$Cl[CF_2CFCl]_nI$$

6. The method claimed in claim 1 wherein the iodide has the formula $$CF_2ClCF(CF_3)[CF_2CF(CF_3)]_nI$$

7. A method of coupling the compound 2-iodoperfluorohexane which comprises heating said compound in the presence of mercuric oxide.

8. A method of coupling the compound $CF_2ClCFClI$ which comprises heating said compound in the presence of mercuric oxide.

9. A method of making compounds having the structure $$R[CF_2-CFX]_n[CFX-CF_2]_nR$$

where R is selected from the group consisting of chlorine, fluorine, and alkyl, fluoroalkyl, chloroalkyl and fluorochloroalkyl radicals having not more than about 6 carbon atoms, where X is selected from the group consisting of chlorine and the —$CF_3$ radical, and where $n$ is an integer from 1 to about 20 which comprises heating fluoroalkyl iodides having the formula $$R[CF_2-CFX]_nI$$

where R and X are as defined above, in the presence of mercuric oxide.

10. A method of making perfluoro-5,6-dimethyldecane which comprises heating 2-iodoperfluorohexane in the presence of mercuric oxide.

11. A method of making the compound $$CF_2ClCFClCFClCF_2Cl$$

which comprises heating the compound $$CF_2ClCFClI$$

in the presence of mercuric oxide.

12. A method of making the compound $$CF_2ClCF(CF_3)[CF_2CF(CF_3)]_2$$
$$[(CF_3)CFCF_2]_2(CF_3)CFCF_2Cl$$

which comprises heating the compound $$CF_2ClCF(CF_3)[CF_2CF(CF_3)]_2I$$

in the presence of mercuric oxide.

References Cited in the file of this patent

UNITED STATES PATENTS 2,612,529     Feasley     Sept. 30, 1952

OTHER REFERENCES

Henne et al.: "Jour. Amer. Chem. Soc.," vol. 73, April 1951, p. 1791.